United States Patent [19]

Cearley et al.

[11] Patent Number: 5,064,602

[45] Date of Patent: Nov. 12, 1991

[54] CONTROL ROD FLOW DIVERTERS

[75] Inventors: James E. Cearley, San Jose; David F. Holland, Morgan Hill; David T. Hurt; Frederick J. Moody, both of San Jose, all of Calif.

[73] Assignee: General Electric Company, San Jose, Calif.

[21] Appl. No.: 596,434

[22] Filed: Oct. 12, 1990

[51] Int. Cl.$^5$ .............................................. G21C 7/10
[52] U.S. Cl. .................................................. 376/243
[58] Field of Search ............... 376/353, 332, 243, 333, 376/439, 443

[56] References Cited

U.S. PATENT DOCUMENTS

| | | | |
|---|---|---|---|
| 1,240,081 | 9/1917 | Moss | 210/521 |
| 3,787,286 | 1/1974 | Anthony | 376/439 |
| 4,313,797 | 2/1982 | Ahix | 376/441 |
| 4,684,496 | 8/1987 | Wilson et al. | 376/352 |
| 4,882,123 | 11/1989 | Cearley et al. | 376/333 |

Primary Examiner—Brooks H. Hunt
Assistant Examiner—Frederick H. Voss
Attorney, Agent, or Firm—R. R. Schroeder

[57] ABSTRACT

Flux-trap control rod flow diverters comprising a series of tabs formed along the length of one side of a hafnium neutron absorber tube, and bent inwards towards the opposing side so as to allow water in one side of the tube, and simultaneously divert internal water out of corresponding openings formed in the opposing side of the tube. In this way the internal water does not stay inside the control rod long enough to boil, and the water's effectiveness as a neutron moderator is assured.

7 Claims, 5 Drawing Sheets

CONTROL ROD FLOW DIVERTERS

BACKGROUND OF THE INVENTION

The present invention relates to energy generation systems and, more particularly, to energy generation systems which rely on a controlled particle flux to sustain the generation process. A major objective of the present invention is to improve the stability and effectiveness of neutron absorption in control rods used to regulate energy generation in a nuclear reactor.

Nuclear reactors rely on a controlled, self-perpetuating neutron flux to sustain fission. In a nuclear reactor, neutrons scatter in the uranium-or-plutonium-based fuel rods causing fission. This process generates energy in the form of heat, as well as the additional neutrons needed to keep the reaction self-sustaining. However, since more than one neutron is generated when a uranium or plutonium fission occurs, control rods are used to absorb excess neutrons to keep the reaction in a steady state. Control rods inserted more deeply into the reactor core can absorb enough neutrons to turn the reactor off.

Control rod movement is used to control the reactivity ramp rate. There is a control rod position which maintains the power level constant. By controlled withdrawal of the control rod from this position, the power can be ramped up. When the desired power level is reached, the control rod is inserted back into the constant power position. Alternatively, the control rod can be inserted beyond the constant power level position to ramp down the power. The distance of the control rod from the constant power position determines the reactivity ramp rate.

Conventionally, control rods include a material that has a high absorption cross-section to the neutrons in the reactor core. In particular, a material with a high cross-section to neutrons having the specific momentum that enables them to cause fission in the fuel rods is employed. To be effective, it must absorb the neutron flux of "fission causing" neutrons. Typical control rods comprise a number of parallel hollow tubes filled with a neutron-absorbing material such as boron carbide, hafnium, cadmium, gadolinium, europium, erbium, samarium, dysprosium, silver and/or indium.

Nuclear reactors can be classified according to the method used to transfer fission-generated heat from the reactor core. In boiling-water reactors (BWRs), water is converted to steam as it flows through the core. The steam can be conveyed from the reactor vessel enclosing the core to a turbine. The steam drives the turbine which, in turn, drives a generator to produce electricity.

In addition to serving as the source of steam used to drive the turbine, the water serves as a neutron moderator. High-energy, or "fast" neutrons released during a fission reaction are moderated, i.e., slowed, as they scatter off the hydrogen atoms in the water. Neutron moderation is used to facilitate a chain reaction by slowing neutrons to a momentum at which they can be more easily absorbed by fissionable materials in the fuel elements. Likewise, neutron moderation facilitates control of fission since the slowed neutrons are more readily utilized by the Absorber material in the control rods.

Some reactors have employed control rods utilizing a "flux-trap" design that takes greater advantage of the neutron moderating effect of water. Flux-trap control rods use hollow rather than solid absorber tubes of neutron-absorbing material. The neutron absorption is most effective at water-absorber boundaries. From the perspective of an individual neutron, the more water-absorber interfaces it encounters, the more likely it will be absorbed. A neutron passing through a solid absorber rod passes from water to absorber at most once. A neutron passing through a hollow tube of absorber material can pass through two water-to-absorber boundaries, and thus has a greater chance of being moderated and consequently absorbed. The additional neutrons absorbed at the interface in the internal part of the tube lead to the term "flux-trap".

Typically, the absorption efficiency of a hollow absorber tube is ten to twenty percent higher than it is for a solid absorber rod having the same outer diameter. Since a hollow tube includes less material than a solid rod of the same outer diameter, the flux-trap design provides tubes which require less absorber material. Since absorber materials, notably hafnium, tend to be heavy and expensive, the flux-trap design provides for control rods which are less expensive and more efficient.

One problem encountered when employing flux-trap absorber tubes is that their effectiveness decreases with increasing volume of steam in their interiors. The energy the neutrons impart to the absorber tubes is mostly turned into heat, raising their temperature to around 650-700 degrees Fahrenheit. Since the pressure inside the core is close to 1000 pounds per square inch the reactor water will not boil until its temperature is about 550 degrees Fahrenheit. Water flow inside the core is such that the water comes in from the bottom, and flows upwards in a direction parallel to the absorber tubes. The water flowing external to the absorber tubes travels fast enough past the tubes so it does not boil except for an acceptable amount of surface nucleate boiling. However, the water traveling up the inside of the tubes goes slower than the water external to the tubes, and is more susceptible to boiling from the heat generated in the hafnium.

If the water boils, the volume of water is displaced by the generated steam. Steam is a less effective moderator than water because it provides fewer scattering targets per unit volume. Neutron moderation and, thus, absorption efficiency decreases with increased steam. While this loss of efficiency is undesirable, of even greater concern are the fluctuations in moderation that can occur, as the amount of steam in the tubes can vary rapidly near the water's boiling point.

To alleviate this problem, holes are made in the absorber tube to allow an exchange of water between the inside and outside of the tube. Absorber tubes of this type are described in U.S. Pat. No. 4,882,123. The holes permit relatively cool water from the exterior of the tube to transfer to the interior of the tube so that the tendency to boil is reduced. However, at higher power levels, an undesirable level of interior boiling still occurs. Accordingly, to enhance power control at higher reactor power output levels, flux-trap absorber tubes are desired which more effectively minimize interior boiling.

SUMMARY OF THE INVENTION

In accordance with the present invention, a nuclear reactor control rod incorporates hollow absorber tubes with flow diverters to urge water into and out of the tube interior through transverse pairs of openings in the tube walls. Each transverse pair of openings includes an inlet and an outlet; the inlet and outlet of each pair are at generally the same height in a vertically extending absorber tube. A flow diverter is disposed between each inlet and its respective outlet, which is typically approximately six inches above the inlet. Each diverter occludes the upward flow path within the interior of the tube and also occludes the transverse flow path between its associated inlet and outlet. Each diverter thus diverts water, or other neutronmoderating fluid, from the tube interior to the tube exterior via its associated outlet. This diversion results in a pressure differential through each of the inlets so that external water is urged into the interior of the tube. Each flow diverter has a dual role as an open gate to the incoming water, and as a closed gate to the water flowing up the tube. Thus, relatively hot internal water is periodically replaced by relatively cool external water.

Conveniently, the diverters can be formed by making a series of three-sided cuts on one side of the absorber tube at specified intervals. The cuts define tabs which are then bent inwards to touch the opposite wall on the inside of the tube so as to define a barrier which serves as a flow diverter. Then a hole is made on the opposite side of the tube in the "shade" of each flow diverter. External water is drawn into the tube at the openings where the flow diverters are cut, flows inside the tube until it reaches the spot where the next flow diverter is cut, and is then pushed back outside where it rejoins and is mixed with the cooler external water. Thus the flow diverters have a dual purpose—providing an opening where external water is drawn in and forcing internal water out.

Characteristically, the control rod itself has a two-layer construction, with an outside stainless steel sheath surrounding inside absorber tubes. The sheath has holes on each side of the tubes at the intervals where the flow diverters are located. The absorber tubes have the flow diverters which direct the water flow, and inlet and outlet holes in line with the holes in the sheath. The inlet holes in the absorber tube are made automatically when the flow diverters are cut and bent towards the opposite wall inside the absorber tube, although if the hafnium is thick compared with the internal thickness of the tubes, the inlets may be enlarged.

The flux-trap control rods of the present invention improve upon prior perforated absorber tubes by increasing the exchange flow between the tube interior and the exterior. This exchange reduces the temperature of the fluid flowing in the hollow of the tube, which in turn, reduces boiling. When boiling is reduced, the volume of water within the tube is more stable, maximizing and stabilizing its neutron moderation capabitilies. This results in more effective and reliable control rods.

The incorporation of diverters, as provided by the present invention, thus increases the effectiveness of the flux-trap control rods without requiring major changes in reactor design. The formation of diverters does not require a change in the outer dimensions of the absorber tubes, permitting direct replacement in existing BWRs. These and other features and advantages of the present invention are apparent from the description below, with reference to the following drawings.

DETAILED DESCRIPTION OF THE PREFERRED EMBODIMENT

Figure 1:
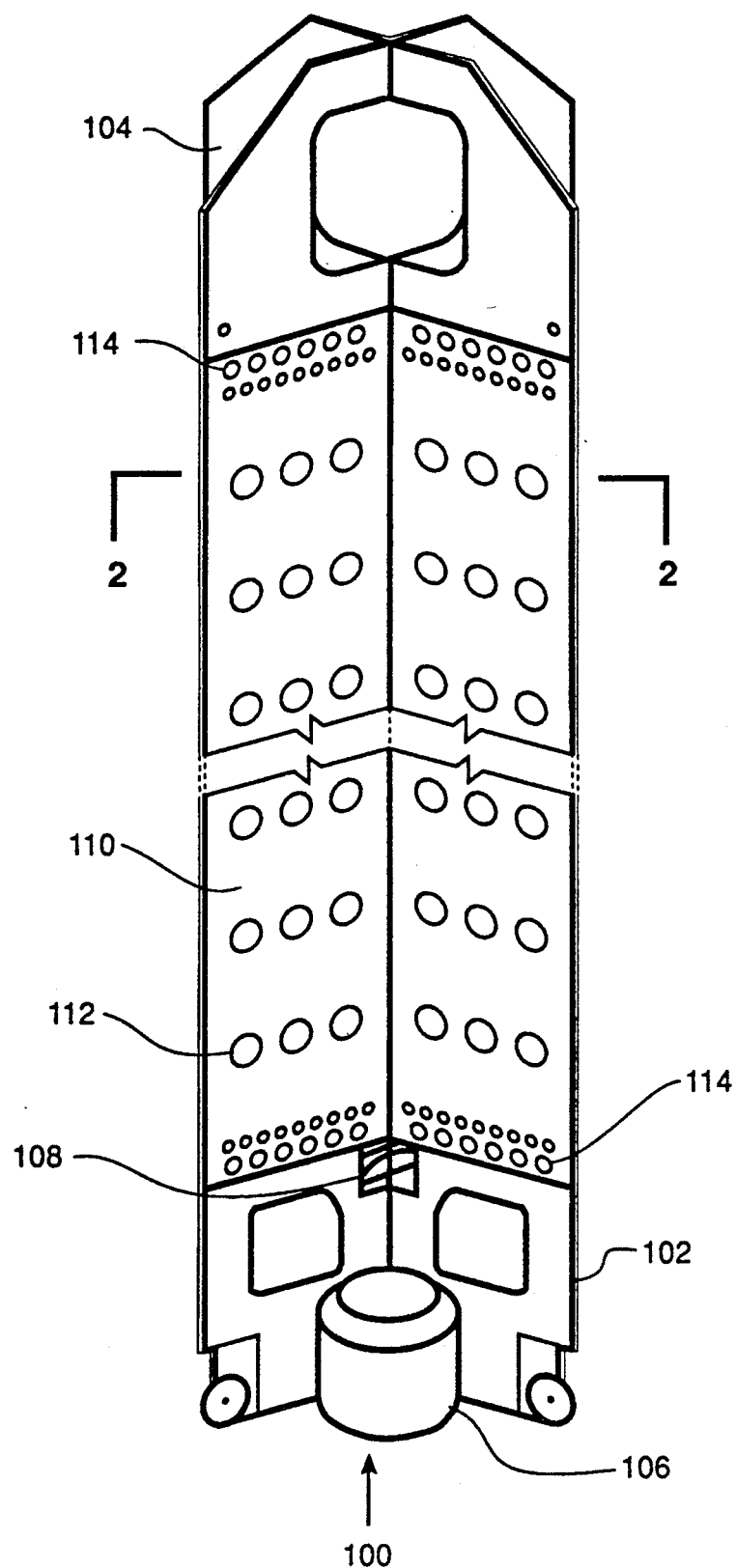
FIG. 1 is a schematic view of a flux-trap control rod in accordance with the present invention.

In accordance with the present invention, flux-trap control rod 100 comprises four wings 102, two of which are shown in FIG. 1. Control rod 100 is accessed from above via handle 104, and is coupled from below to a hydraulic control rod drive with coupling socket 106, which may be released with coupling release handle 108. The hydraulic control rod drive raises, or lowers, control rod 100 to control the reactivity of the reactor core.

Each wing 102 comprises an outer stainless steel sheath 110 with openings 112 that correspond to the openings in the hollow absorber tubes inside the sheath. When control rod 100 is in place in the reactor, water along its length is exchanged between the outside of the control rod and the inside of the absorber tubes. Openings 114 allow water to enter the bottom and leave the top of the absorber tubes through sheath 110.

Figure 2:
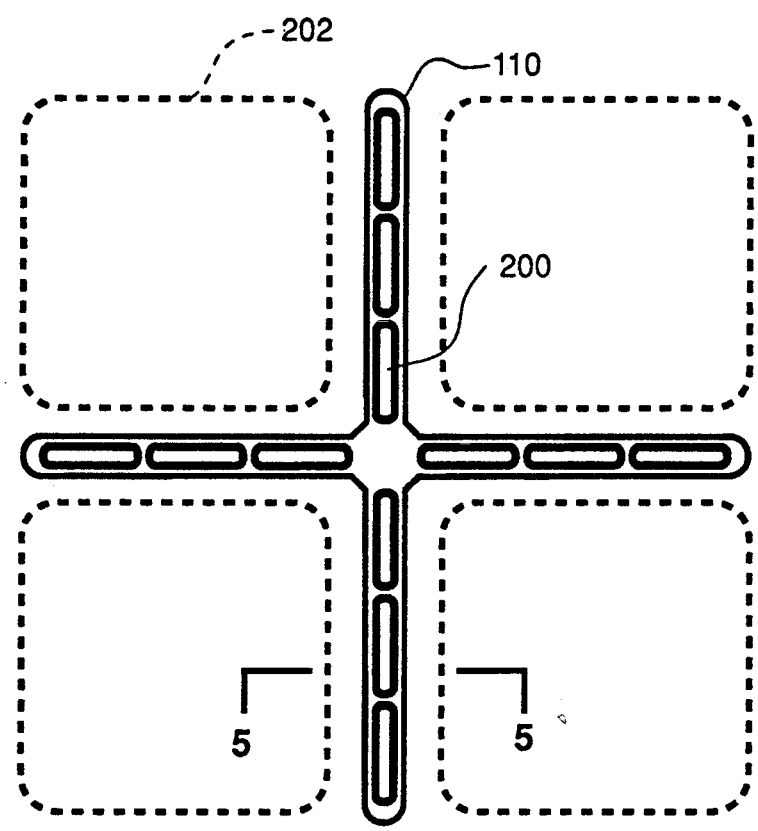
FIG. 2 is a schematic cross-sectional plan view of the flux-trap control rod of FIG. 1.

The flux-trap control rod 100 of the present invention has a cruciform configuration (looks like a "plus" sign (+) from above), as can be seen from FIG. 2. Each wing 102 contains three absorber tubes 200. These define four quadrants where fuel assemblies are located, indicated by dotted lines 202.

Figure 3:
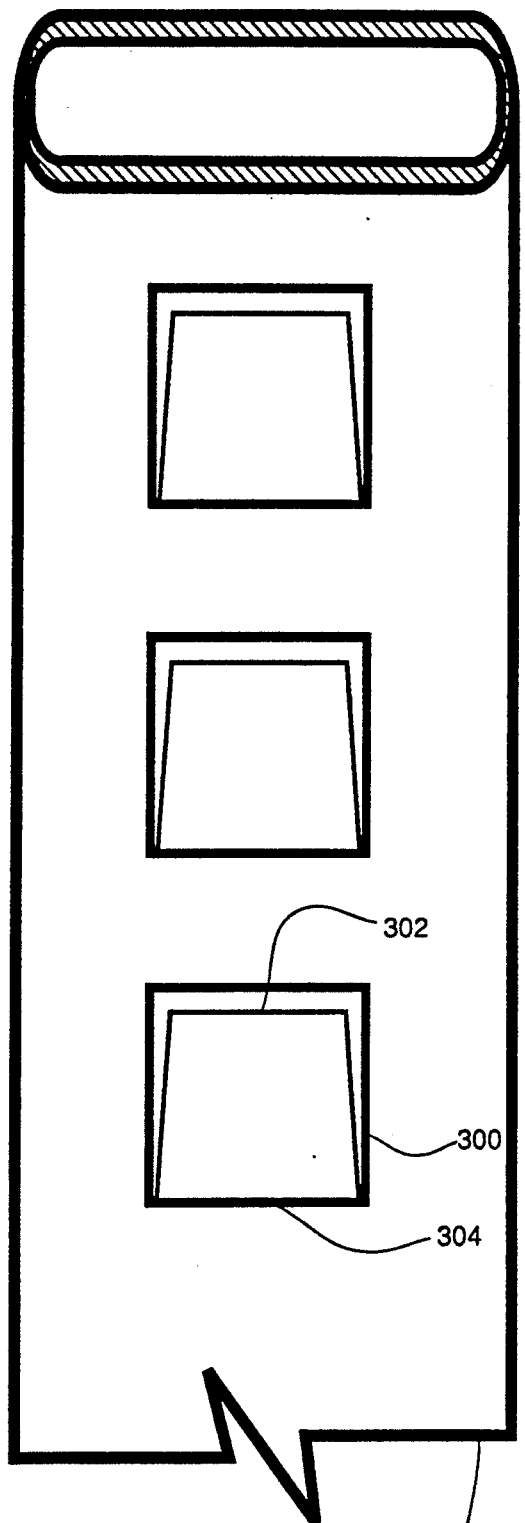
FIG. 3 is a schematic view of the inlet side of an absorber tube in accordance with the present invention.

A neutron-absorber tube 200 has water inlets 300, flux-trap control rod flow diverters 302, and an attachment portion 304, as shown in FIG. 3. The flow diverters 302 are made by cutting tabs out of absorber tube 200 while leaving integral attachment portions 304. The tabs are bent inwards until they touch the opposite wall of absorber tube 200, thus forming flow diverters 302, as well as inlets 300. In a preferred embodiment of the present invention, the absorber tube 200 is made of hafnium, and the inlets 300 and flow diverters 302 are rectangular. The size of the inlets 300 and flow diverters 302 may be varied to divert any, or virtually all of the water flowing up absorber tube 200.

Figure 4:
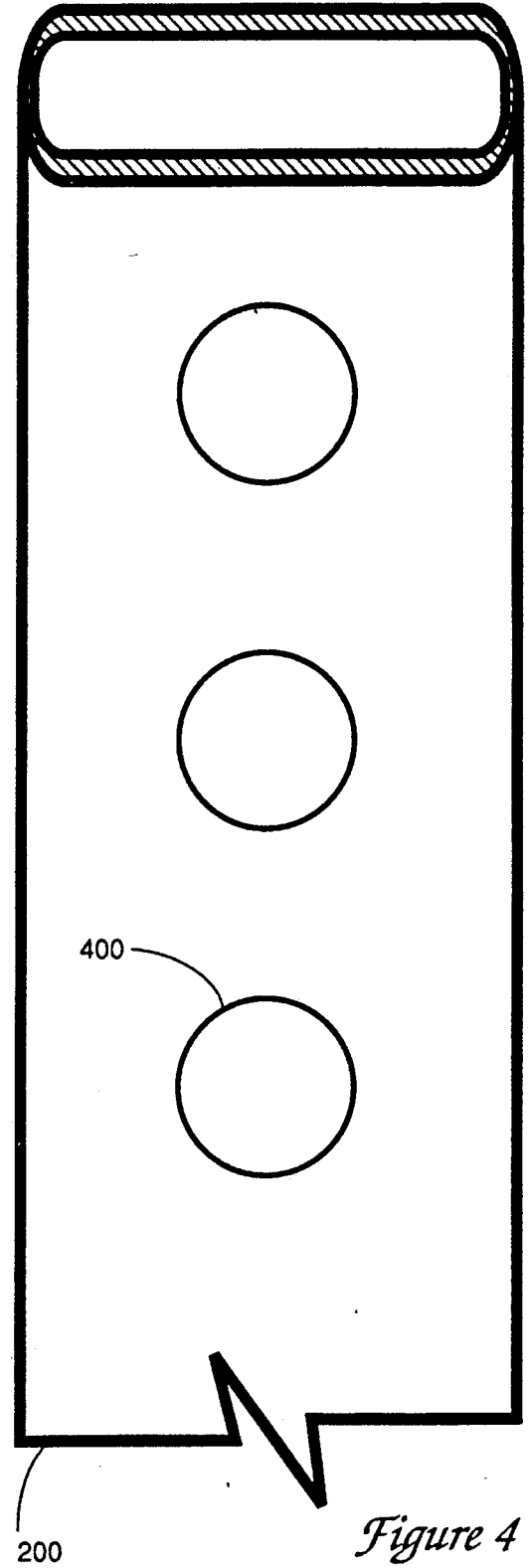
FIG. 4 is a schematic view of the outlet side of an absorber tube in accordance with the present invention.

Neutron absorber tube 200 has outlets 400, as shown in FIG. 4. The outlets 400 oppose inlets 300, and are located directly beneath the point where flow diverters 302 touch the inner wall of absorber tube 200. The spacing and size of flow diverters 302 are such that the water flowing through absorber tube 200 is diverted through outlets 400 before it has a chance to boil. In a preferred embodiment of the present invention, the outlets 400 are circular. At least a portion of the water traveling up absorber tube 200 is diverted through outlets 400 by flow diverters 302. Inlets 300 are about the same size as outlets 400, which reduces pressure gradients.

Control rod 100 has hafnium absorber tubes 200 with flat opposing sides and rounded ends as shown in FIGS.

3 and 4. The tubes are about 12' long, and made in two 6' sections with an expansion joint in between to accomodate temperature changes. The hafnium in the top section is 0.07" thick. In the bottom section it is half as thick, 0.035". Both sections have the same outer dimensions.

The absorber tube 200 has a width of 1.35", and a thickness of 0.22". The radius of curvature at each of the corners is about 0.11". Inlets 300 are rectangular with widths of 0.4", and heights of 0.5" in the bottom section and 0.6" in the top section. Flow diverters 302 are 0.4" wide and 0.5" high in both sections. The inlets 300 in the top section are slightly larger than the flow diverters 302 because the hafnium is thicker than in the bottom section, and doesn't leave as large of an opening when bent to the opposite wall. Outlets 400 are circular with a 0.4" diameter. Inlets 300 and outlets 400 are spaced at 6 inch intervals along the length of the absorber tube 200, with the top of the outlets 400 located at the same spot the tab diverters 302 touch when bent.

Rectanglular inlets 300 are preferred because the resultant flow diverters 302 remain flush with the opposite wall in an absorber tube 200, shaped as shown in FIGS. 3 and 4. Circular outlets 400 are preferred because they have the most area for a given perimeter, leaving absorber tube 200 more intact.

Figure 5:
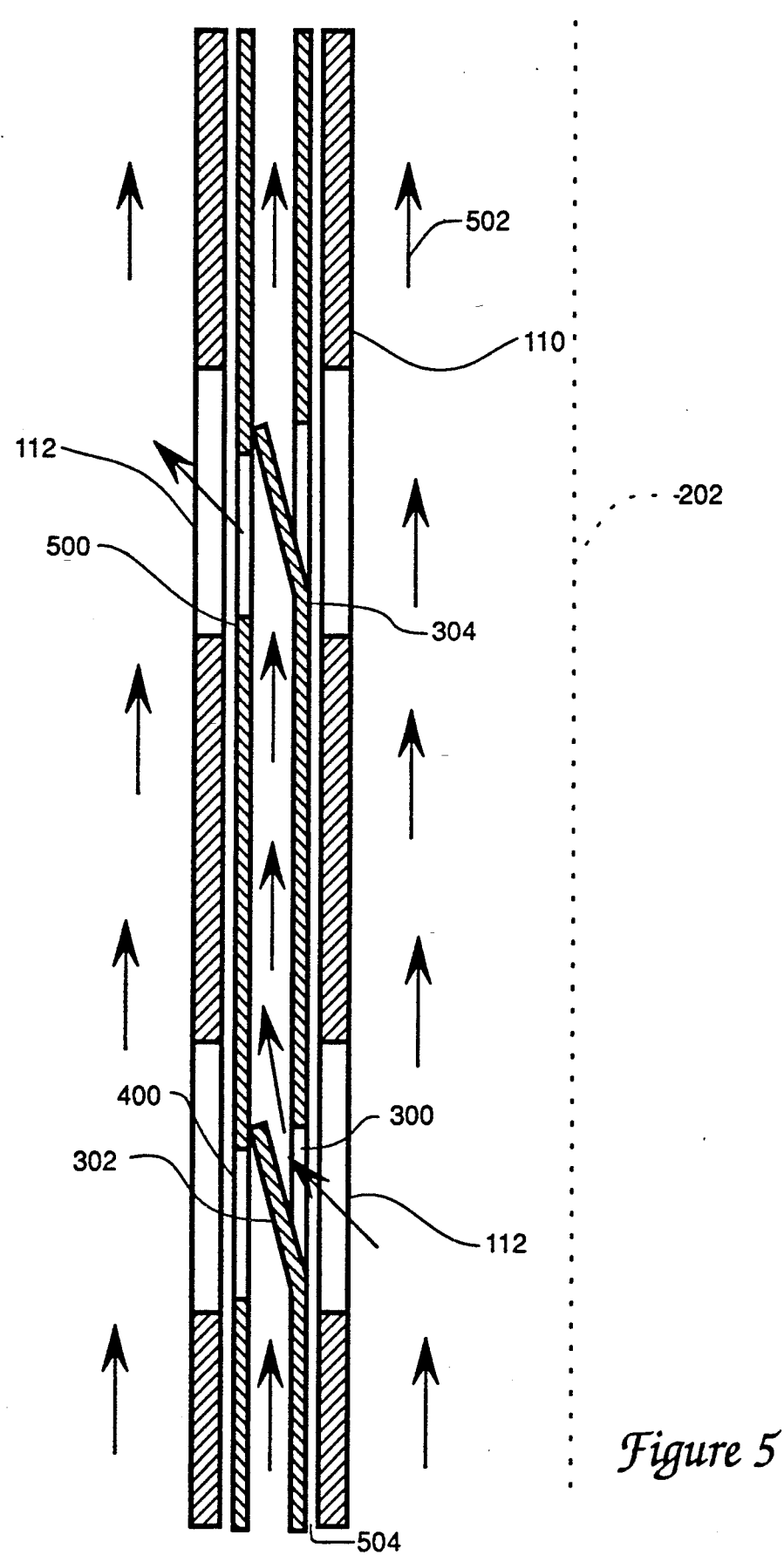
FIG. 5 is a schematic cross-sectional view of a flux-trap control rod utilizing absorber tubes in accordance with the present invention, showing the exchange of water between the interior and exterior of the control rod.

FIG. 5 shows a cross-section of a single wing 102 of control rod 100 when operational, i.e., inside the reactor core, with the resultant water flow. Sheath openings 112 coincide with, and are slightly larger than, inlets 300 and outlets 400 in absorber tube 200. The difference in size is shown by the overlap portion 500 of absorber tube 200, and is there to take into account the difference in thermal expansion between hafnium and stainless steel. A small gap 504 also separates sheath 110 and absorber tubes 200 for this same reason.

Water flow, indicated by arrows 502, is essentially parallel to flux-trap control rod 100. External water between control rod 100 and the fuel assemblies (located at dotted line 202) enters control rod 100 through inlet openings 300, and flows up absorber tube 200 to the next flow diverter 302, where it is at least partially diverted back outside through outlet openings 400. The active divergence of the water to the exterior of control rod 100 through outlets 400 causes more water to be drawn through the corresponding inlets 300. This is where the improvement lies when compared to the prior art passive exchange of water through simple openings. As can be seen in FIG. 5, flow diverters 302 are bent inwards until they touch the opposing wall of absorber tube 200 while remaining attached at attachment portion 304.

Since the internal water is substantially replenished with external water at every flow diverter 302 as it travels up the flux-trap control rod 100, it does not reach saturation and boil. Thus its effectiveness as a neutron moderator is assured. In turn, absorber tube 200 has increased effectiveness as a neutron absorber, and the flux-trap control rods 100 of the present invention work reliably with a constant efficiency in a boiling water reactor operating at full power.

Figure 6:
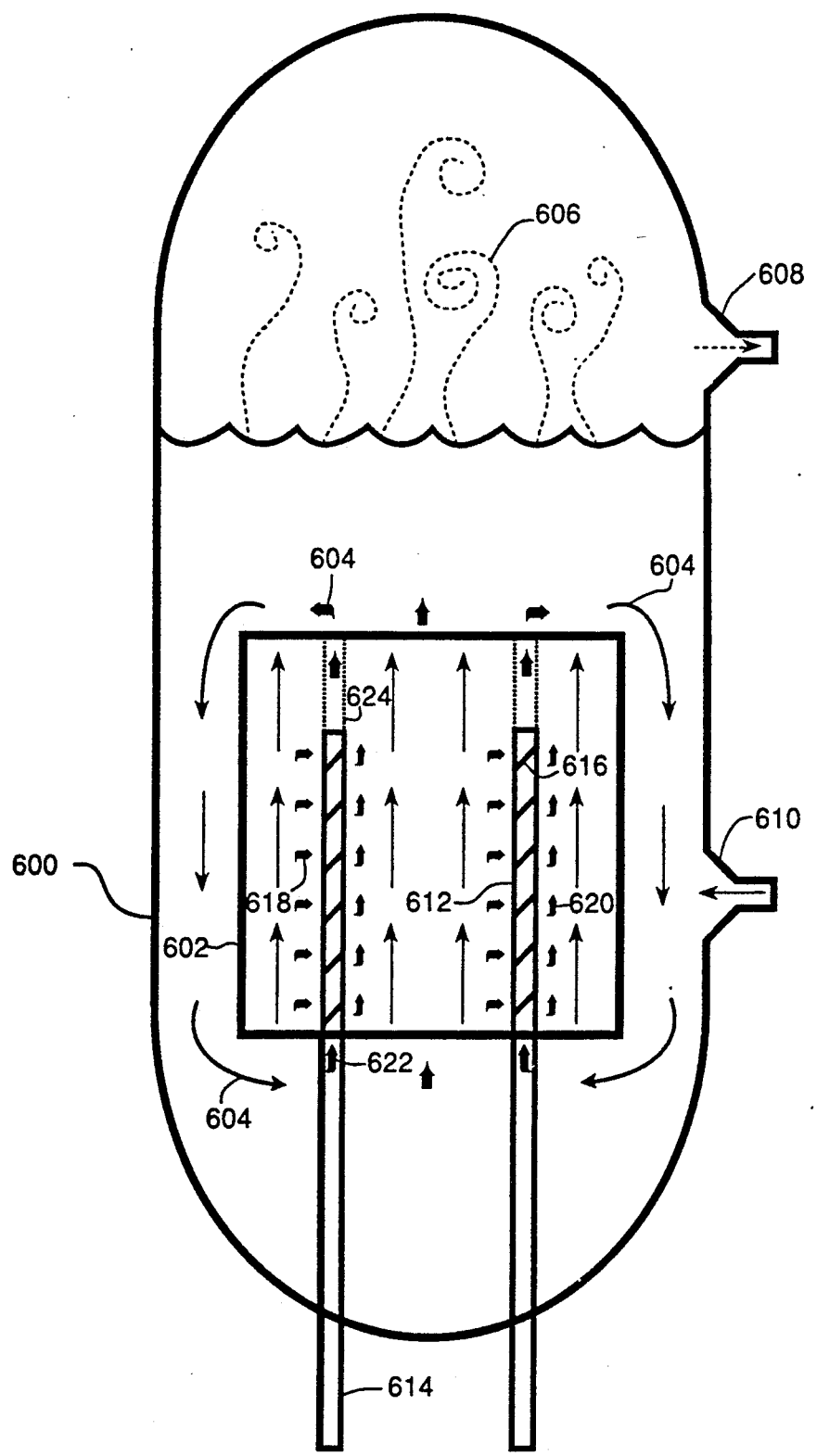
FIG. 6 is a schematic view of the water flow in a reactor pressure vessel utilizing flux-trap control rods in accordance with the present invention.

FIG. 6 provides a general overview of the waterflow in a reactor pressure vessel equipped with control rods of the present invention. Inside pressure vessel 600 is reactor core 602. Waterflow 604 travels up through core 602 (using pumps, which are not shown) where it is partially converted to steam 606. Steam 606 goes through outlet 608, and is used to turn turbines which turns a generator to produce electricity. The steam is passed through a cooler, or "heat exchanger", to condense it to water, which enters pressure vessel 600 through inlet 610, where it rejoins reactor water 604. The reactor water that was not vaporized travels down the outside periphery of core 602 after it has emerged from the top, and repeats the cycle.

Regions 612 in core 602 depict two control rod configurations (not to scale), each consisting of a control rod and its four associated fuel assemblies. Extensions 614 below pressure vessel 600 house the hydraulic drives that raise and lower the control rods. Diagonals 616 represent the locations of each set of twelve flow diverters along the length of each control rod configuration 612. The waterflow at the inlets and outlets associated with flow diverters 616 is shown respectively by arrows 618 and 620. Water 622 entering the bottom of control rod configurations 612 is continually exchanged between the interior and exterior of the twelve absorber tubes in each configuration 612 as it flows upwards, and boiling inside the absorber tubes is prevented.

Although inlets and outlets are shown as rectangular and circular, respectively, other shapes can be employed. Moreover, rectangular flow diverters can have rounded vertical sides so the shape of flow diverters more closely approximates the internal cross-section of the absorber tube. Such an arrangement forces the exchange of more hot internal water for cooler external water at each of the intervals where inlets and outlets are located. Inlets can be trapezoidal, with a wide attachment portion to strengthen the flow diverters. Inlets and outlets with circular or oblong shapes tend to maximize area while minimizing perimeter, and thus tend to leave the absorber tube more intact for a given surface area.

One advantage of the present invention is the amount of latitude there is in fitting the flux-trap control rod to the specific engineering and environmental constraints it may be exposed to inside the BWR. To avoid internal boiling under a given set of circumstances, the flow diverters may be made larger, relative to the internal cross-sectional area of the absorber tubes, and spaced further apart. Alternatively, the flow diverters can be smaller or spaced closer together. The ease with which the flow diverter configuration can be made to fit individual situations is inherent in the design of the present invention.

An additional advantage of the present invention is the facility with which one can modify the flow diverters to accomodate variations in the internal and external water temperatures along the length of the absorber tubes. The spacing, shape, and/or size of the flow diverters can be varied along the length of each tube individually. The flow diverters may also be utilized with hafnium absorber tubes that have varying thicknesses along the length of the tubes, of the type mentioned in U.S. Pat. No. 4,882,123, and described above.

The present invention thus provides a flux-trap design control rod for a boiling water reactor that is both effective in preventing internal boiling, and adaptable to external conditions. Flow diverters may also be utilized with absorber tubes that have various internal cross-sectional shapes.

The present invention also provides for a range of embodiments not described above. The neutron absorbing material need not be hafnium, but can be any other suitable material. Likewise, moderators other than water are used in alternative embodiments. Flux-trap control rods of the present invention can be made with any combination of a liquid moderating material and bendable absorbing material. These and other modifications to and variations upon the described embodiments are provided for by the present invention, the scope of which is limited only by the following claims.

What is claimed is:

1. In a nuclear reactor system including a core containing fissionable fuel elements and a fluid circulation system for circulating heat transfer fluid through said core, said heat transfer fluid being a more effective neutron moderator in a liquid phase than in a vapor phase, said core having control rod passages therethrough into which control rods can be inserted and through which said heat transfer fluid flows, a control rod comprising:

a hollow tube having a wall defining a circumference and a longitudinally extending interior space;

transverse flow means for allowing said fluid to enter and exit said interior space through said wall, said transverse flow means including a longitudinally extending series of pairs of openings, each of said pairs including an inlet and an outlet, each of said outlets generally transversely opposing a respective one of said inlets; and diverter means for diverting fluid through said outlets from said interior space, said diverter means including a barrier for each of said pairs of openings, each of said barriers at least partially occluding longitudinal fluid flow along said interior space and at least partially occluding transverse fluid flow between each pair of said openings;

whereby heat transfer fluid flowing longitudinally through said interior space is exchanged with fluid flowing through said control rod passage and external to said interior space, whereby the presence of the vapor phase of said fluid in said interior space is diminished and the neutron absorption effectiveness of said control rod is enhanced.

2. A device as recited in claim 1 wherein each of said barriers is a tab formed from said wall so as to define one inlet opening of each respective pair of openings, each of said tabs having an attachment end at said inlet opening about which it is bent to occlude said interior space.

3. A device as recited in claim 2 wherein each of said tabs has a distal end opposing said attachment end, each of said tabs being bent radially inward so that its distal end contacts said wall at a circumferential position along said wall generally opposed to that at which its attachment end is located.

4. A device as recited in claim 3 wherein each outlet opening of each pair of respective openings is upstream of said circumferential position.

5. A device as recited in claim 4 wherein said tube is hafnium.

6. A device as recited in claim 5 wherein said inlet openings are rectangular and said outlet openings are circular.

7. A flux-trap control rod comprising:

a hollow hafnium tube, said tube having a length and opposing first and second sides extending lengthwise along said tube;

said first side having a series of cuts spaced at equal intervals along the length of said tube, said cuts being three sided so as to form rectangular tabs attached to said first side with an integral attachment portion of said first side, said tabs being bent inwards into the interior of said tube to touch said second side at a contact portion, and form first openings along the length of said first side of said tube;

said second side having a series of second circular openings corresponding to, and opposing said first openings in said first side, wherein for each of said first openings there is exactly one opposing second opening, and wherein said second openings extend from said contact portion towards the perpendicular projection of said attachment portion on said second side; and a stainless steel sheath covering said tube, said sheath having third openings, each of said first openings and each of said second openings being adjacent to a respective one of said third openings so that said sheath does not occlude any of said first and second openings;

whereby, water enters said tube through said third and first openings, and leaves said tube through said second and third openings.

* * * * *